United States Patent [19]

Assard

[11] Patent Number: 4,563,756
[45] Date of Patent: Jan. 7, 1986

[54] PSEUDO-RANDOM NOISE GENERATOR CALIBRATION FOR ACOUSTIC HYDROPHONES

[75] Inventor: Gerald L. Assard, Waterford, Conn.

[73] Assignee: The United States of America as represented by the Secretary of the Navy, Washington, D.C.

[21] Appl. No.: 481,532

[22] Filed: Apr. 1, 1983

[51] Int. Cl.[4] .............................................. H04R 29/00
[52] U.S. Cl. ..................................................... 367/13
[58] Field of Search ......................... 367/13, 137, 138; 434/6, 8, 9

[56] References Cited

U.S. PATENT DOCUMENTS 3,700,780 10/1972 Roeschlein ........................ 367/13 X
3,916,533 11/1975 Kijesky ..................................... 434/9

Primary Examiner—Richard A. Farley
Attorney, Agent, or Firm—Robert F. Beers; Arthur A. McGill; Prithvi C. Lall

[57] ABSTRACT

A pseudo-random noise generator (PRNG) or a hard clipped tonal is remotely employed as an acoustic signal simulator for calibrating individual hydrophone channels of an acoustic array. The PRNG is employed to present a complete measurement of the channel gain and phase vs. frequency characteristics. The circuitry provides for synchronizing a channel hydrophone PRNG's to obtain gain and phase comparison of a single channel measurement. The hard clipped tonal provides the gain vs. frequency of the channel transfer function. In addition a binary signal is provided for changing the gain of the channel.

2 Claims, 1 Drawing Figure

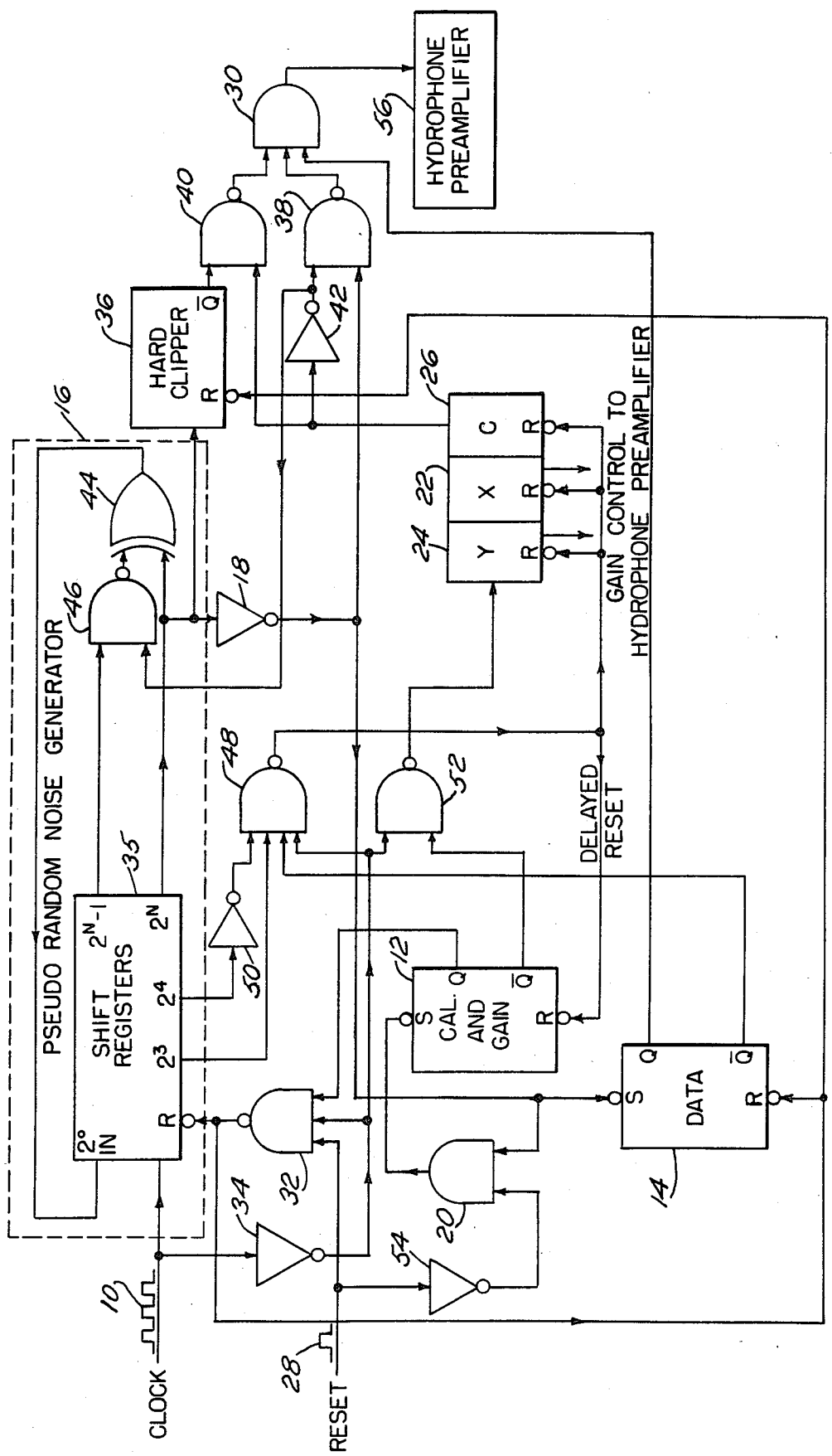

PSEUDO-RANDOM NOISE GENERATOR CALIBRATION FOR ACOUSTIC HYDROPHONES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

To check the performance of an acoustic array, it is advisable to include a calibration circuit within the hydrophone channels for evaluating the gain and phase vs. frequency for a particular hydrophone channel as well as providing step gain control.

(2) Description of the Prior Art

Analog tonals of low distortion with absolute gain and phase are difficult to provide within the hydrophone preamplifier circuitry. Therefore, it is common practice to employ a hard clipped tonal. The clipped tonal presents a fundamental and all its odd harmonics. A hard clipped tonal does not provide a continuous gain and phase vs. frequency function. When processing data from a multi-element array, it is essential that the gain and phase vs. frequency are stable and maintained within specifications.

SUMMARY OF THE INVENTION

This system provides for the following three requirements, a hard clipped calibration, pseudo-random noise generator (PRNG) calibration and a binary gain control.

A hard clipper gives the gain vs. frequency of the channel transfer function and phase vs. frequency information but only at odd harmonic frequency points of the fundamental hard clipped signal.

The addition of the pseudo-random noise generator (PRNG) can be employed to present a complete measurement of the channel gain and phase vs. frequency characteristics. A PRNG made up of N-shift registers running with a clock frequency fc will present a set of spectral points spaced at $$\frac{fc}{(2^N - 1)} \text{ hz.}$$

The magnitude of the spectral output of the PRNG presented as a function of frequency will vary as $$20 \log \left( \frac{\sin(\pi f/fc)}{(\pi f/fc)} \right).$$

The magnitude will break through $-3$ dB at $$f = .442946471 fc.$$

The PRNG provides a broadband spectrum that can be included within the acoustic hydrophone calibration circuit. The magnitude of the spectral response can be more easily maintained because the PRNG function is delivered as a hard clipped two-level square wave. In summary, the inclusion of the PRNG function can provide for the much needed and required measurement of the acoustic hydrophone channels gain and phase characteristics.

The channel usable dynamics range can be much greater than the instantaneous dynamic range requirements. A channel gain change can often insure that the data requirements are within the instantaneous dynamic range limitations. For application where the instantaneous dynamic range performance is much less than the usable dynamic range specification, the throughput channel requirements can be relaxed. An example of this is the A-law companded A/D converter that employs the 8-bit word consisting of 1-bit sign, 3-bits exponent, and 4-bits mantissa to provide a reduction in the channel throughput bit requirement. The A-law companded A/D provides for a 12-bit A/D usable dynamic range, but only presents a 5-bit magnitude instantaneous dynamic range. The integration of a 2-bit binary gain control can be employed to present four gain options. For the above example, gain options of 0, +12, +30, and +48 dB could be employed to provide for an equivalent 20-bit A/D usable dynamic range while maintaining the 5-bit magnitude instantaneous dynamic range.

BRIEF DESCRIPTION OF THE DRAWING

The FIGURE is a diagram of a system that provides simulated hard clipped calibration, a pseudo-random noise generated calibration function and a two bit binary gain control function in accordance with the present invention.

DESCRIPTION OF THE PREFERRED EMBODIMENT

Referring now to FIGURE there is shown a block diagram of a binary system that is adapted for remotely providing calibration signals into individual hydrophone channels. This block diagram provides for a pseudo-random noise generator signal, a hard clipped tonal signal and binary X, Y gain settings within a channel for processing. These three functions are developed from a sequence clock and reset down link command.

The circuit is designed to come up in an arbitrary mode at turn on. A sequence of N clock pulses 10 will insure that the calibration and gain register 12 as well as the data register 14 are set. Both calibration and gain register 12 and data register 14 are R-S flip-flops. The clock pulses 10 set the data register 14 through PRNG 16 and inverter 18. Calibration and gain register 12 is set through PRNG 16, inverter 18 and AND gate 20. However, because the logic turns on in an arbitrary fashion the binary counters X gain 22, Y gain 24 and calibration mode C 26 are also in an arbitrary position. The register 12 provides a one state from its output Q and NAND gate 32. While clock pulse 10 is zero a one state is provided to NAND gate 32 through inverter 34. The initial reset pulse 28 is then permitted to pass through NAND gate 32 to reset register 14, the N shift registers 35 of the PRNG 16 and the hard clipper 36. The hard clipper 36 includes a binary counter having A stages. The PRNG 16 $2^N$ output in series with inverter 18 presents a one state input to NAND gate 38 and the hard clipper 36 presents a one state to NAND gate 40. Therefore, one of the NAND gates 38 or 40 will present a required zero state to the calibration AND gate 30. This is because the output of the C register 26 must be present at one state at the input of either NAND gate 40 or its complemented input through inverter 42 into NAND gate 38.

The data register 14 provides a one state to the delayed reset NAND gate 48 from its $\overline{Q}$ output. The exclusive OR gate 44 of PRNG 16 provides for a one state as an input to the first shift register $2^0$ of the PRNG block 16. This is because all PRNG 16 registers are in a reset condition with all register outputs reset to zero state. NAND gate 46 receives a zero state from the $2^{N-1}$ register output of shift registers 35. This insures a one state from NAND gate 46 to exclusive OR gate 44. The other input to the exclusive OR gate 44 from the $2^N$ register of shift registers 35 is zero state. This has exclusive OR gate 44 giving a one state as feedback to register $2^0$ of shift registers 35.

This one state is shifted through the shift registers 35. When the one state reaches register $2^3$, it is presented to the delayed reset NAND gate 48. The zero state of the following register $2^4$ becomes a one state at inverter 50 and this one state is also presented to the delayed reset NAND gate 48. A delayed reset zero state pulse is then executed by NAND gate 48 upon the return to zero state of clock pulse 10 which is converted to one state by inverter 34. This delayed reset zero state pulse from NAND gate 48 clears the calibration and gain register 12, the C register 26, Y register 24 and X register 22. The calibration and gain register 12 provides a zero state to NAND gate 32 to block the next required reset pulse 28 from executing another reset of the data register 14 and the shift register 35 of PRNG 16. Register 12 $\overline{Q}$ output provides a one state to NAND gate 52. The following sequence of a pedetermined number of clock pulses 10 provide for a counting sequence of the 26, 24 and 22 registers through gates 34 and 52. While clock pulse 10 is in the one state the count is stopped by employing a reset pulse 28 through inverter 54 and AND gate 20 to the set command of the calibration and gain register 12. The reset pulse 28 is blocked from passing through NAND gate 32 because clock pulse 10 is in the one state and becomes zero state when passed through inverter 34. The calibration and gain register 12 provides a zero state from the $\overline{Q}$ output to stop the count sequence provided by NAND gate 52 and the register 12 Q output provides a one state to NAND gate 32. NAND gate 32 is now capable of responding to any further reset signals 28 that are executed when clock pulse 10 is in the zero state and therefore passes a one state to NAND gate 32 through inverter 34. The one bit stream continues through PRNG 16. As the one state passes through register $2^N$, it provides a set command from inverter 18 to the data register 14. Data register 14 then presents a zero state from its $\overline{Q}$ output. This deactivates NAND gate 48 and thus prevents the generation of more delayed reset commands. The output terminal Q of the data register 14 presents a one state to activate the cal NAND gate 30 that feeds signals to hydrophone preamplifier 56. The state of the C register 26 sets the calibration mode. A C register 26 output of one state activates the hard clipped register NAND gate 40. A C register output of zero state activates the PRNG 16 NAND gate 38 through inverter 42. If the C register 26 output is zero state, NAND gate 46 receives a one state through inverter 42 and completes the PRNG 16 feedback. This is because the PRNG feedback provides for the EXCLUSIVE OR circuit 44 operating on signals directly from the $2^N$ output of shift register 35 and the signals from the $2^{N-1}$ output of shift register 35 that have passed through NAND gate 46. The output of the EXCLUSIVE OR gate 44 is fed back to the input $2^0$ of shift register 35 to complete the PRNG function. The output is taken from the $2^N$ output of register 35 and sent to NAND gate 38 through inverter 18 and presented to the hydrophone preamplifier 56 through AND gate 30. This pseudo random noise time function generated at the clock 10 frequency develops a set of spectral components spaced at the clock 10 frequency $f_c$ divided by $2^N-1$ Hz. If the output state of the C register is one state, NAND gate 46 receives a zero state from inverter 42 and is inhibited. This forces the PRNG 16 block to become a divide by N function. This divide by N function is presented to the hard clipper 36 and provides for the division of the clock pulse 10 to produce a low frequency square wave output for calibration through NAND gates 40 and 30 to hydrophone preamplifier 56.

The generation of the calibration signals continues until the execution of another reset pulse 28 command. The receipt of the reset pulse 28 resets the shift registers 35 of PRNG 16 through NAND gate 32 to an all zero state and resets data register 14 and hard clipper 36 through the same NAND gate 32. A zero state pulse is presented from the Q output of data register 14 to calibration AND gate 30 thereby inhibiting further signals passing through AND gate 30 to hydrophone preamplifier 56. The inputs providing both clock pulses 10 and reset pulses 28 are then simultaneously deactivated to prevent the execution of another sequence of gain and calibration commands.

The PRNG 16 has been designed to fulfill three circuit requirements. It provides the circuitry to generate the timing sequence to load the C register 26, the X register 22 and the Y register 24. It provides the circuitry to generate the calibration PRNG function. It is also part of the hard clipper 36 divider network.

The X register 22 and the Y register 24 provide two binary bits to produce four levels of fixed gain to the channel. The gains can be set to respond to the four available states of the X register 22 and Y register 24. The system for providing this gain control is described in my co-pending application Gain-Step Companding Analog-to-Digital Converter, Ser. No. 277,447, filed June 25, 1981, now U.S. Pat. No. 4,383,247.

There has therefore been described a system that is capable of making gain and phase vs. frequency measurements of a hydrophone array that is deployed in water. This is a new feature that was not available prior to this invention. The inventive system provides for synchronizing a channel hydrophone PRNG to obtain gain and phase comparison of a single channel output vs. its input. If a separate system is used for each hydrophone then a channel vs. channel measurement can be made. The circuit also has provisions for its integration into a network scenario that can combine individual channels to present either synthesized nearfield or farfield PRNG (wide band) or hard clipped (narrow band) targets.

The inclusion of the binary gain change will accommodate the data transfer requirements where the instantaneous dynamic range does not demand the full usable dynamic range of the channel. For example, the companded A/D has a much smaller instantaneous dynamic range resolution than a linear A/D of the same bit length. The gain change will provide for matching the analog data to the quantizer to optimize the reduction of quantizer noise.

It will be understood that various changes in details, materials, steps and arrangement of parts, which have been herein described may be made by those skilled in the art within the principle and scope of the invention as expressed in the appended claims.

What is claimed is:

1. An acoustic signal simulator for calibrating at the hydrophone level within an acoustic array comprising:

a hydrophone preamplifier;

pseudo-random noise generator means having a plurality of shift registers for developing a time function comprised of a set of bi-level signals generated at the clock frequency, said pseudo-random noise generator means adapted for providing said signals to said hydrophone preamplifier; and hard clipper means for providing a bi-level signal of predetermined period to said hydrophone preamplifier; and selector means for selecting either of said pseudo-random noise generator means or said hard clipper means.

2. An acoustic signal simulator according to claim 1 further comprising acoustic gain means for providing a step gain control of said hydrophone preamplifier via a combination of predetermined clock and reset pulse commands.

* * * * *